US010843032B2

(12) United States Patent
King et al.

(10) Patent No.: US 10,843,032 B2
(45) Date of Patent: Nov. 24, 2020

(54) BILATERAL HAND REHABILITATION DEVICE AND SYSTEM

(71) Applicant: CALLAGHAN INNOVATION, Lower Hutt (NZ)

(72) Inventors: Marcus James King, Christchurch (NZ); Michael John Sampson, Christchurch (NZ)

(73) Assignee: CALLAGHAN INNOVATION, Costa Mesa (NZ)

( * ) Notice: Subject to any disclaimer, the term of this patent is extended or adjusted under 35 U.S.C. 154(b) by 175 days.

(21) Appl. No.: 15/778,598

(22) PCT Filed: Nov. 28, 2016

(86) PCT No.: PCT/IB2016/057145
§ 371 (c)(1),
(2) Date: Sep. 12, 2018

(87) PCT Pub. No.: WO2017/090009
PCT Pub. Date: Jun. 1, 2017

(65) Prior Publication Data
US 2019/0269962 A1 Sep. 5, 2019

(30) Foreign Application Priority Data
Nov. 26, 2015 (NZ) .................................. 714562

(51) Int. Cl.
*A63B 21/00* (2006.01)
*A63B 23/035* (2006.01)
(Continued)

(52) U.S. Cl.
CPC ...... *A63B 21/4035* (2015.10); *A63B 21/4047* (2015.10); *A63B 23/03533* (2013.01);
(Continued)

(58) Field of Classification Search
CPC ............ A63B 23/14–16; A63B 1/4043; A63B 1/4047; A63F 13/24–245; A61H 1/0285–0288
See application file for complete search history.

(56) References Cited

U.S. PATENT DOCUMENTS 2,643,123 A    6/1953   Milton
3,653,659 A *   4/1972   Zinkin .................. A63B 23/16
                                                      482/49
(Continued)

FOREIGN PATENT DOCUMENTS

AU    2014202518 A1    5/2014
CN    100386063 C      5/2008
(Continued)

OTHER PUBLICATIONS

International Patent Application No. PCT/IB2016/057145; Int'l Preliminary Report on Patentability; dated Jun. 7, 2018; 6 pages.
(Continued)

*Primary Examiner* — Jennifer Robertson
(74) *Attorney, Agent, or Firm* — BakerHostetler; Mark H. Krietzman

(57) ABSTRACT

A bilateral hand rehabilitation device is disclosed. The device includes a pair of left and right handlebar members that are fixedly coupled or connected together. The device further includes a pair of moveable left and right finger grip members, one for each of the handlebar members. Each finger grip member being elongate and having a longitudinal axis that is substantially parallel to the longitudinal axis of its respective handlebar member, and each finger grip member being moveably mounted with respect to its respective handlebar member for movement toward and away from the handlebar member to facilitate a user finger grasp and release movement when in use. The device further includes an asymmetric connection mechanism that operatively
(Continued)

couples the pair of finger grip members to each other for simultaneous asymmetric movement of the finger grip members such that the movement of one finger grip member toward or away from its respective handlebar member causes the other finger grip member to move in the opposite direction away or toward its respective handlebar member.

25 Claims, 14 Drawing Sheets

(51) Int. Cl.
  *A63B 23/16* (2006.01)
  *A63B 71/00* (2006.01)
  *A63F 13/24* (2014.01)
  *A63B 21/16* (2006.01)
  *A63B 71/06* (2006.01)

(52) U.S. Cl.
  CPC .......... *A63B 23/16* (2013.01); *A63B 71/0009* (2013.01); *A63F 13/24* (2014.09); *A63B 21/157* (2013.01); *A63B 21/16* (2013.01); *A63B 21/169* (2015.10); *A63B 71/0622* (2013.01); *A63B 2220/10* (2013.01); *A63B 2220/16* (2013.01); *A63B 2220/36* (2013.01); *A63B 2220/40* (2013.01); *A63B 2220/51* (2013.01); *A63B 2220/58* (2013.01); *A63B 2220/801* (2013.01); *A63B 2225/09* (2013.01); *A63B 2225/50* (2013.01)

(56) References Cited

U.S. PATENT DOCUMENTS

| | | | |
|---|---|---|---|
| 5,484,355 | A | 1/1996 | King et al. |
| 5,529,550 | A | 6/1996 | Maycock, Jr. et al. |
| 5,698,782 | A | 12/1997 | Gledhill |
| 6,149,612 | A | 11/2000 | Schnapp et al. |
| 7,438,669 | B1 | 10/2008 | Bloom |
| 8,523,792 | B2 | 9/2013 | Weisz et al. |
| 2007/0265148 | A1 | 11/2007 | Lin |
| 2009/0191967 | A1* | 7/2009 | Konishi .................. A63F 13/06 463/37 |

FOREIGN PATENT DOCUMENTS

| | | |
|---|---|---|
| JP | 2010-201111 A | 9/2010 |
| JP | 3173845 U | 2/2012 |
| KR | 10-1501527 B1 | 3/2015 |

OTHER PUBLICATIONS

European Patent Application No. 16868130.2; Extended Search Report; dated Mar. 22, 2019; 7 pages.
Sampson et al.; Bilateral upper limb trainer with virtual reality for post-stroke rehabilitation: case series report; Disability and Rehabilitation: Assistive Technology; vol. 7(1); Jan. 2012; p. 55-62.
Flores et al.; "Improving Patient Motivation in Game Development for Motor Deficit Rehabilitation"; ACM Advances in Computer Entertainment Technology; 2008; p. 381-384.
Burgar et al.; "Development of robots for rehabilitation therapy: The Palo Alto VA/Stanford experience"; Journal of Rehabilitation Research and Development; vol. 37 No. 6; 2000; p. 663-673.
Contu et al.; "Influence of visual information on bimanual haptic manipulation"; IEEE Int'l Conf. on Rehabilitation Robotics; Aug. 2015; p. 961-966.
Volpe et al.; "A novel approach to stroke rehabilitation—Robot-aided sensorimotor stimulation"; American Academy of Neurology; 2000; p. 1938-1944.
Lum et al.; "MIME robotic device for upper-limb neurorehabilitation in subacute stroke subjects: A follow-up study"; Journal of Rehabilitation Research & Development; vol. 43 No. 5; 2006; p. 631-642.
Werner et al.; "The non-paretic hand moves the paretic limb: presentation of a mechanical arm trainer for independent training of severe affected patients after stroke"; Neurol Rehabil; vol. 11(6); 2005; p. 342-345 (contains English Abstract).
Triandafilou et al.; "Transient Impact of Prolonged Versus Repetitive Stretch on Hand Motor Control in Chronic Stroke"; Topics in Stroke Rehabilitation; vol. 18(4); 2011; p. 316-324.
Delden et al.; "A Systematic Review of Bilateral Upper Limb Training Devices for Poststroke Rehabilitation"; Stroke Research and Treatment; vol. 2012; Article 972069; 2012; 17 pages.
Eliot Van Buskirk; "Revolutionary Glove could Rehabilitate Guitarist's Hand"; https://wired.com/2008/12/revolutionary-g/; Dec. 2008; 3 pages.
http://www.indiamedico.com/physiotherapy_equipments/shoulder_arm_hand_exercises.php; India Medico Instruments; accessed Jun. 26, 2019; 2 pages.
Dr. Larry Leifer; "Rehabilitative Robots"; Robotics Age; 1981; p. 4-14.
International Patent Application No. PCT/IB2016/057145; Int'l Written Opinion and the Search Report; dated Feb. 13, 2017; 8 pages.

* cited by examiner

BILATERAL HAND REHABILITATION DEVICE AND SYSTEM

FIELD OF THE INVENTION

This invention relates to a rehabilitation device and system for hands.

BACKGROUND TO THE INVENTION

A patient with hemiparesis is typically able to move one arm in a normal manner, but the other arm on the opposite side of their body is at least partially paralysed. In simple terms, the paralysis of the arm is caused by damage to the brain in areas that control the arm or that side of the body. Physically, there is actually nothing actually wrong with the paralysed limb. Neuroplastic recovery from brain injury and the rehabilitation of an affected arm by bilateral relearning and cortical remodeling is well known. Briefly, this involves retraining undamaged parts of the brain, which previously carried out different functions from controlling limbs, to control the paralysed limbs. Neuroplasticity is the fundamental issue that supports the scientific basis for treatment of acquired brain injury with goal-directed experiential therapeutic programs in the context of rehabilitation approaches to the functional consequences of the injury.

Rehabilitation of the hands is a very challenging operation because of the large number of movements a hand can make and the complex positioning of the end of the arm.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of the invention to provide a bilateral hand rehabilitation device and system to assist in wrist and/or hand and/or fingers and/or arm rehabilitation, or to at least provide the public with a useful choice.

In a first aspect, the invention broadly consists in a bilateral hand rehabilitation device comprising:
  a pair of left and right handlebar members that are fixedly coupled or connected together;
  a pair of moveable left and right finger grip members, one for each of the handlebar members, each finger grip member being elongate and having a longitudinal axis that is substantially parallel to the longitudinal axis of its respective handlebar member, and each finger grip member being moveably mounted with respect to its respective handlebar member for movement toward and away from the handlebar member to facilitate a user finger grasp and release movement when in use; and
  an asymmetric coupling or connecting or linking mechanism that operatively couples the pair of finger grip members to each other for simultaneous asymmetric movement of the finger grip members such that the movement of one finger grip member toward or away from its respective handlebar member causes the other finger grip member to move in the opposite direction away or toward its respective handlebar member.

In an embodiment, the handlebar members are spaced-apart from one another and are separate members. In another embodiment, the handlebar members may be portions or parts of a common member or integral with each other.

In an embodiment, the handlebar members have longitudinal axes that are parallel to each other. In an embodiment, the handlebar members are vertical or upright members. In alternative embodiments, the handlebar members need not be parallel to each other, but may have longitudinal axes that extend at an angle either toward or away from one another, or may have longitudinal axes that are co-axial such that they are aligned in a common axis, e.g. horizontally-orientated handlebars.

In an embodiment, the pair of handlebar members are provided on or mounted to a common base. By way of example, the base may be substantially planar and the handlebars may extend vertically upward from the planar base. Optionally, a horizontal upper crossbar member may extend between the upper ends of the handlebar members.

In an embodiment, the finger grip members are pivotally mounted for pivotal or arced movement toward and away from their respective handlebar members. In an embodiment, the path or range of pivotal movement is restricted between a closed or grasp position at or toward the handlebar member, and an open or release position displaced away from the handlebar member.

In an embodiment, the pivot axis of each finger grip member is offset relative to the longitudinal axis of its respective handlebar member. For example, the pivot axis of the finger grip member may be offset into substantial alignment with the knuckles of hands of a user of the device.

In an embodiment, the handlebar members are provided in a handlebar assembly that comprises the base, handlebar members and the upper crossbar member.

In an embodiment, the finger grip members further comprise upper and lower transverse connecting plates that are coupled to the upper and lower ends of each respective finger grip member to provide respective finger grip assemblies. In an embodiment, the finger grip assemblies are pivotally mounted adjacent or relative to their respective handlebar members on opposite sides of the handlebar assembly via pivotal connections or couplings between the upper and lower connecting plates of each finger grip assembly and respective upper and lower portions of the handlebar assembly.

In an embodiment, the handlebar members are configured to engage the palm and/or thumb of the hands of a user.

In an embodiment, the finger grip members are configured to engage or be gripped by the inner finger surfaces of the hands of a user.

In an embodiment, each finger grip assembly further comprises a vertical release member that extends between the upper and lower connecting plates and which is offset from the finger grip member. By way of example, the release member is configured to engage or face the outer or dorsal finger surfaces of the hands of a user when in use. In one configuration, the position and orientation of the release member relative to the finger grip member may be adjusted. In an embodiment, the longitudinal axis of the release members are parallel to the finger grip members and handlebar members.

In an embodiment, the handlebar members, finger grip members, and asymmetric connection mechanism are parts of a hand grip assembly, and the hand grip assembly is pivotally mounted to a mounting assembly. In one configuration, the mounting assembly provides the hand grip assembly with at least one degree of pivotal movement, but preferably two or more degrees of pivotal movement.

In an embodiment, the mounting assembly enables the hand grip assembly to rotate relative to at least one pivot axis defined by the mounting assembly. In one configuration, the hand grip assembly is pivotal relative to two orthogonal pivot axes provided by the mounting assembly. In an embodiment, the two pivot axes are spaced-apart.

In an embodiment, the mounting assembly provides a first pivot axis extending in the bisecting plane between the handlebar members of the handlebar assembly, to enable the hand grip assembly to be tilted from side to side (i.e. rotated either clockwise or anti-clockwise about the first pivot axis), and a second pivot axis that is a transverse orientation relative to the first pivot axis and which allows the hand grip assembly to pivot back and forth (i.e. rotate clockwise or anti-clockwise about the second transverse pivot axis). In this configuration, the first pivot axis extends in a plane that corresponds to the sagittal plane of the user of the device, and the second pivot axis extends in a plane parallel to the coronal plane of the user of the device.

In an embodiment, the mounting assembly comprises a base that is releasably securable to a support surface or structure, such as a table or other horizontal support surface or similar. In one configuration the base comprises one or more clamping mechanisms to secure the base to the support surface or structure.

In an embodiment, the mounting assembly further comprises a link member having two ends, the link member being pivotally coupled to the base at or toward one end, and pivotally coupled to the hand grip assembly at or toward the other end. In one configuration, the pivot axes defined by the pivotal couplings or connections at the first and second ends of the link member are transverse to each other to provide the first and second transverse pivot axes of the mounting assembly.

In an embodiment, the bilateral hand rehabilitation device further comprises one or more movement or rotation or position sensors, load sensors, and/or switches that are configured to sense interaction with the bilateral hand rehabilitation device by a user. In an embodiment, the bilateral hand rehabilitation device is operatively connected to an interactive gaming system and the output signals from the one or more sensors and/or switches are processed to enable the user to interact with the gaming system via moving and manipulating the bilateral hand rehabilitation device, including operating switches either directly or via particular movements of the rehabilitation device.

In a second aspect, the invention broadly consists in a bilateral hand rehabilitation system comprising:

a bilateral hand rehabilitation device of the first aspect of the invention; and an interactive gaming system that presents an interactive game to a user of the rehabilitation device on a display and processes sensor and/or switch output signals generated in response to user interaction with the rehabilitation device to enable the user to interact with the present game via use of the rehabilitation device as an input or control device for the interactive gaming system.

The second aspect of the invention may have any one or more of the features mentioned in respect of the first aspect of the invention.

Definitions or Terms or Phrases

The term 'comprising' as used in this specification and claims means 'consisting at least in part of'. When interpreting each statement in this specification and claims that includes the term 'comprising', features other than that or those prefaced by the term may also be present. Related terms such as 'comprise' and 'comprises' are to be interpreted in the same manner.

Number Ranges

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term 'and/or' means 'and' or 'or', or both.

As used herein '(s)' following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

1. Overview

Figure 1:
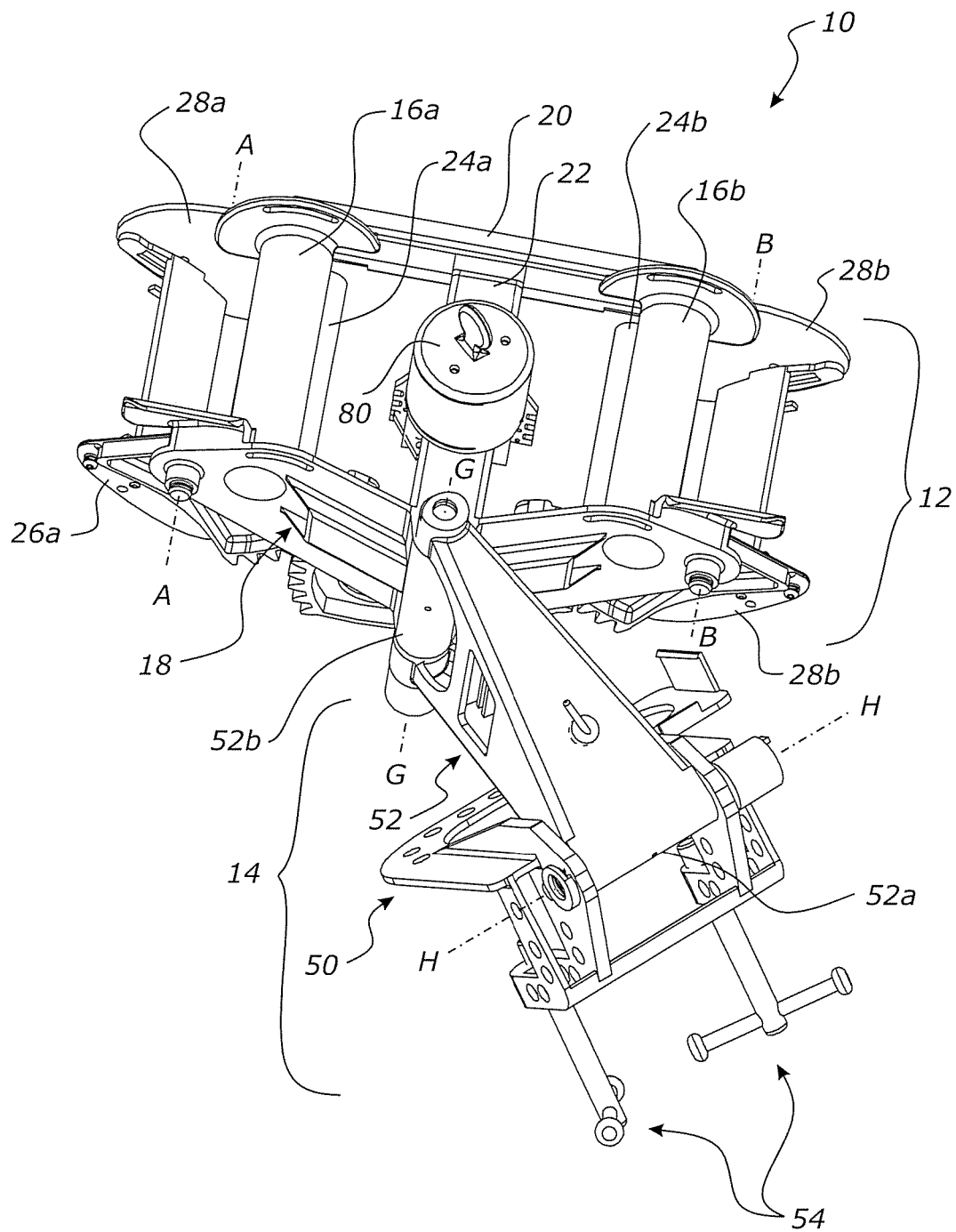
FIG. 1 is a front perspective view of an embodiment of the bilateral hand rehabilitation device in a rest state.

The invention relates to a bilateral hand rehabilitation device and system. The rehabilitation device is particularly suited to a person with partial paralysis of an arm and enables a person to exercise the paralysed wrist, hand and/or fingers of an affected arm in a device which is powered by the unaffected wrist, hand and/or fingers of the other unaffected arm. This is particularly useful for a stroke victim suffering hemiplegia, which is when one side of the body is partially paralysed.

The bilateral hand rehabilitation device is primarily configured to exercise a user's finger grasp and release movements, and is provided with an asymmetric design in which a grasp or release movement performed by one hand causes a simultaneous opposite release or grasp movement of the other hand, i.e. a grasp movement performed by one hand causes a release movement in the other hand and vice versa. This asymmetric configuration enables the strength of the user's grasp in the unaffected hand to effectively power the release movements of the other partially affected hand.

Following stroke, a flexion pattern often dominates (fingers tend to be clenched) and the release of the individuals stroke-affected hand grasp is difficult for many stroke survivors to achieve or even to exercise in practice. The hand rehabilitation device enables users to carry out repetitive movement patterns of finger grasp and release with their stroke-affected hand to assist in recovering from the stroke or other neurological injury or disease via the mechanism of neuroplasticity. Hemiplegia often results in contracture of a stroke survivors hand grip so that the hand tends to naturally relax into a grasp position. Grasp is usually strong relative to release and hence grasp of the unaffected hand is used to release the contracture of the affected hand.

Optionally, in addition to the finger grasp and release movements, the hand rehabilitation device also provides at least one other degree of freedom of movement of the wrist and/or user's upper arms via tilt or rotation of the device with respect to at least one or more pivot axes. For example, in one configuration, the hand rehabilitation device may allow for pivoting of the device from side to side relative to the user and/or fore-aft movements relative to the user, i.e. tilting or pivoting toward or away from the user.

In some configurations, the rehabilitation device is provided with one or more movement or position sensors, one or more load sensors and one or more operable switches. The rehabilitation device may be operatively coupled, for example via a hardwired link or over a wireless data link to an interactive gaming system (e.g. computer, smart television, gaming console or any other programmable device with an associated display) such that the use and manipulation of the hand rehabilitation device (e.g. finger grasp and release movements, tilting movements side-to-side or fore-aft, and/or direct or indirect switch actuation) can be sensed and used as input to the interactive gaming system to enable the user to interact with a presented game using the rehabilitation device as the input device. The output signals of the movement or position sensors, load sensors and/or actuated switches may be processed by the gaming system or pre-processed and input to an API of the gaming system to enable the user to interact with the displayed game presented by the gaming system.

2. Example Embodiment Configuration

Referring to FIGS. 1-15, an example embodiment of the bilateral hand rehabilitation device 10 will be described in further detail.

In this embodiment, the rehabilitation device 10 comprises an upper hand grip assembly 12 that is mounted to a lower mounting assembly 14. The hand grip assembly 12 is gripped by the left and right hands of a user and provides for the asymmetric finger grasp and release movements. The lower mounting assembly 14 is provided with one or more pivot axes to enable the hand grip assembly to pivot or rotate relative to one or more pivot axes such that the hand grip assembly is mounted to the mounting assembly 14 with at least one degree of freedom of rotation or tilt movement.

In this embodiment, the mounting assembly provides two spaced apart pivot axes that have a transverse or orthogonal orientation relative to each other to provide for side-to-side tilt or pivotal movements and fore-aft tilt or pivotal movements of the supported hand grip assembly 12. The mounting assembly 14 is configured to be secured to a support surface device or structure, including but not limited to a table or similar. In this embodiment, the mounting assembly is configured to be releasably securable to a support structure such as a table, but alternatively the mounting structure could be permanently mounted to another support structure or surface such as a wall or table or similar.

Each of the hand grip assembly 12 and mounting assembly 14 will be described in further detail below. The various components of the rehabilitation device, such as the hand grip assembly and mounting assembly may be formed of any suitable material or materials, such as plastic or metal for example. The various components of the sub-assemblies may be separately formed and then connected to form the sub-assembly or alternatively the sub-assemblies may be formed as integral parts.

Hand Grip Assembly

In this embodiment, the hand grip assembly 12 comprises a pair of left and right spaced apart handlebar members 16a,16b as shown in FIGS. 1-4. The handlebar members 16a,16b have a generally upright or vertical orientation. The handlebar members 16a,16b are elongate and the longitudinal axis of the handlebar members are parallel to each other. In alternative embodiments, the handlebars need not be parallel components, and may extend at an angle toward or away from each other, or may have a co-axial alignment in that their longitudinal axes extend along a common axis. In such embodiments, the handlebar members may also alternatively be respective opposite portions or parts of a common or integral single handlebar component.

In this embodiment, the handlebar members are fixed or yoked relative to each other in a handlebar sub-assembly. In this embodiment, the handlebar sub-assembly comprises a base component or frame 18 from which each of the upright handlebar members 16a, 16b extend. In this embodiment, the handlebar sub-assembly further comprises an upper crossbar member 20 that extends between the upper ends of the handlebar members 16a, 16b.

In this embodiment, the handlebar sub-assembly may further comprise a central upright frame member 22 that extends between the base frame 18 and upper cross-member midway between the handlebar members 16a, 16b. The central upright frame member 22 may mount one or more switches or operable dials or knobs with which the user may interact during use of the device for example. These switches, dials or knobs may generate one or more representative signals, which may be used to interact with a gaming system, as will be further described below.

In this embodiment, the handlebar members 16a, 16b are substantially cylindrical. However, it will be appreciated that in alternative embodiments the handlebar members may have a non-uniform cross-sectional shape on their length and the cross-sectional shape may not necessarily be circular. In use, the handlebar members 16a, 16b are configured to be gripped by the thumb and/or palm of the left and right hands of a user.

In this embodiment, the hand grip assembly 12 further comprises a pair of finger grip members 24a, 24b, one finger grip member being associated with each respective handlebar member 16a, 16b. The finger grip members 24a, 24b are elongate members and are configured in use to engage with the inner surfaces of the fingers of the respective hand of the user. The finger grip members 24a, 24b are moveably mounted relative to their respective handlebar members to allow each finger grip member to move toward its respective handlebar member during a grasp movement, or away from its respective handlebar member during a release or finger extension movement. As previously described, the pair of finger grip members are operatively coupled to each other via an asymmetric connection mechanism such that the movement of one finger grip member in one direction causes the other finger grip member to simultaneously move in the opposing direction, i.e. if one finger grip member is moving toward its respective handlebar member, then this causes the other finger grip member to move away from its respective handlebar member, and vice versa.

In this embodiment, each finger grip member is provided in a finger grip sub-assembly. In this embodiment, each finger grip sub-assembly comprises a lower plate 26a, 26b and an upper place 28a, 28b between which the upright finger grip members 24a, 24b extend. In this embodiment, the finger grip members 24a, 24b are each pivotally mounted for pivotal movement toward or away from their respective handlebar member 16a, 16b. The longitudinal axis of the finger grip members 24a, 24b are maintained in parallel alignment to the longitudinal axis of their respective handlebar members 16a, 16b during movement.

In this embodiment, each of the finger grip sub-assemblies is pivotally mounted adjacent to its respective handlebar member 16a, 16b of the handlebar sub-assembly. By way of example, each finger grip sub-assembly may be pivotally coupled adjacent to its respective handlebar member by pivotal upper and lower connections that pivotally couple the upper plate 28a, 28b of the sub-assembly to an upper flange of the handlebar member 16a, 16b or another upper part of the handlebar sub-assembly, and a lower pivotal connection that couples a lower plate 26a, 26b of the finger grip sub-assembly to the base 18 of the handlebar sub-assembly.

As can be seen in FIGS. 1-4, the upper and lower pivotal connections of each finger grip sub-assembly adjacent to its associated handlebar member 16a, 16b of the handlebar subassembly define respective pivot axes AA, BB about which each finger grip sub-assembly can pivot or rotate to enable the finger grip members 24a, 24b to move toward and away from their respective handlebar members 16a, 16b. In this embodiment, the pivot axes AA, BB of the finger grip sub-assemblies are offset or displaced or spaced apart from the longitudinal axis of their respective handlebar members. In one configuration, the pivot axes AA, BB are offset such that they are substantially aligned with the knuckles of the hands of a user, and this assists in creating a natural finger grip and release movement.

Optionally, each finger grip sub-assembly may further have an elongate release member 30a, 30b that extends between lower 26a, 26b and upper 28a, 28b plates. The release members 30a, 30b are spaced apart from their respective handlebar member 16a, 16b and finger grip member 24a, 24b and located in position to allow for the outer surfaces of a user's fingers and/or hands to engage with the release member should the user need additional leverage to move the finger grip member away from its respective handlebar member to the open or release position in a release movement.

Figure 3:
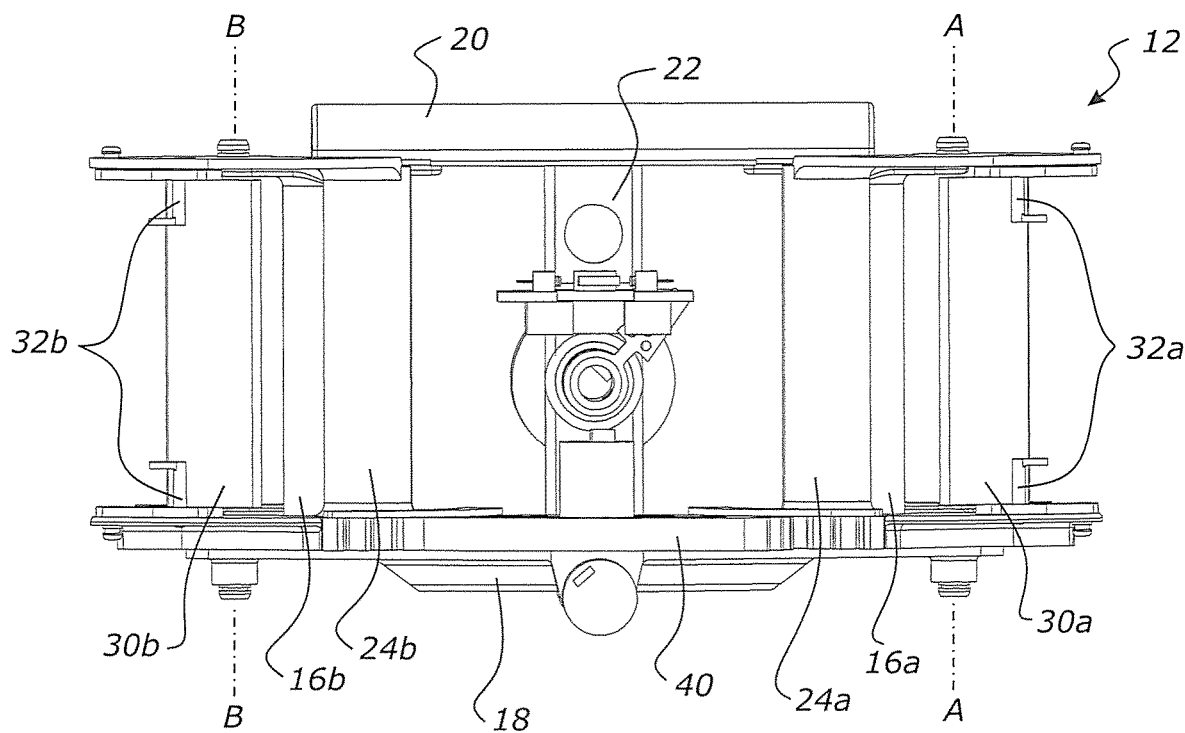
FIGS. 3 and 4 show rear and front elevation views respectively of a hand grip assembly of the bilateral hand rehabilitation device of FIG. 1.
Figure 4:
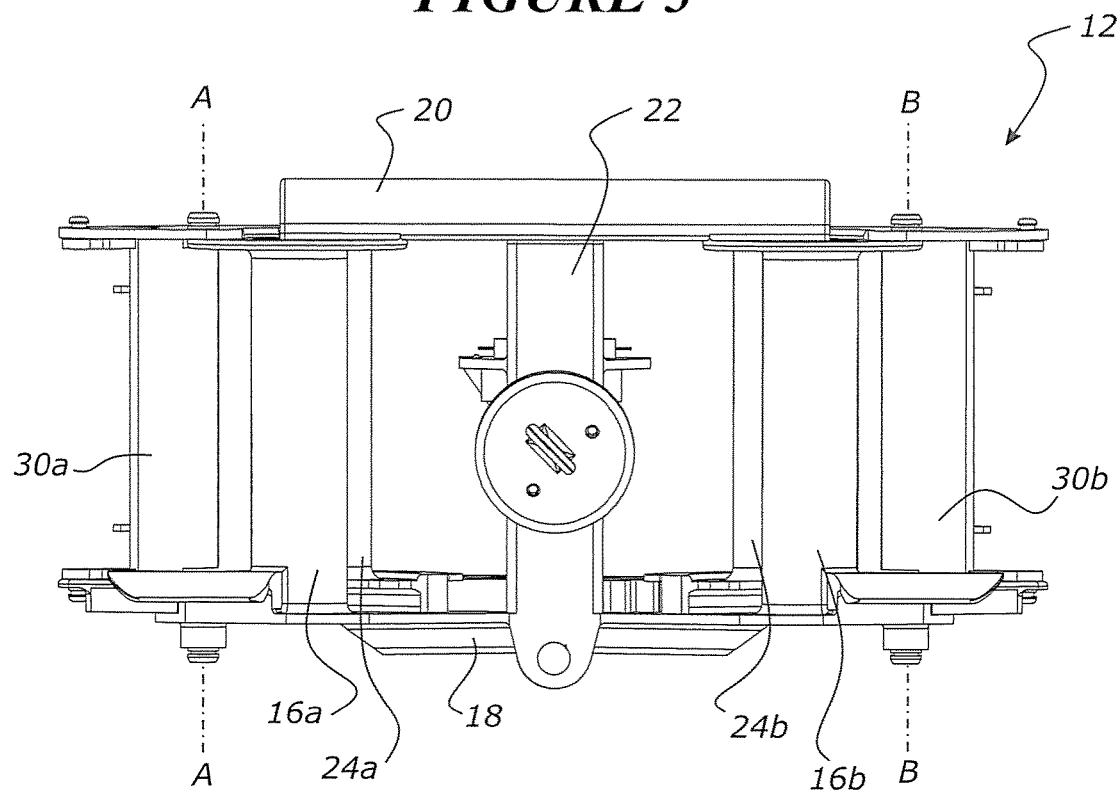
Figure 5:
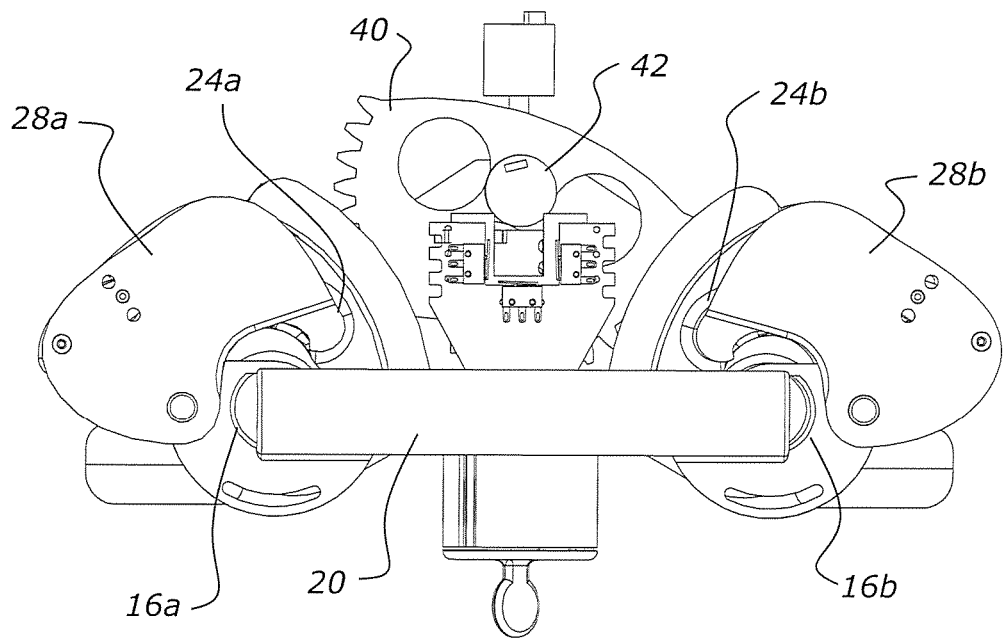
FIGS. 5 and 6 show top plan and underside views respectively of the hand grip assembly of FIGS. 3 and 4.
Figure 6:
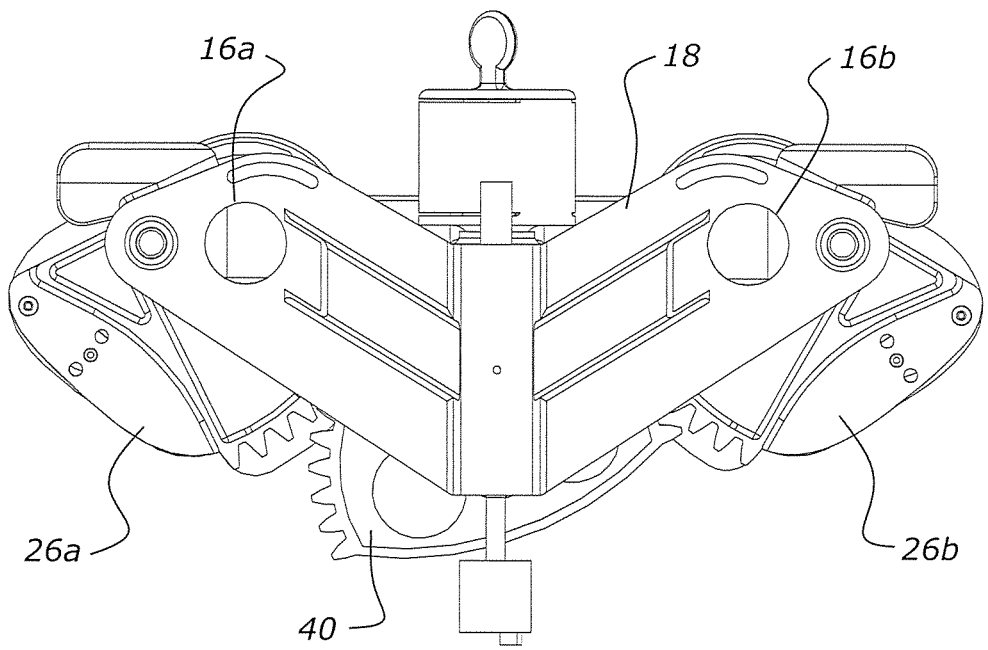
Figure 7:
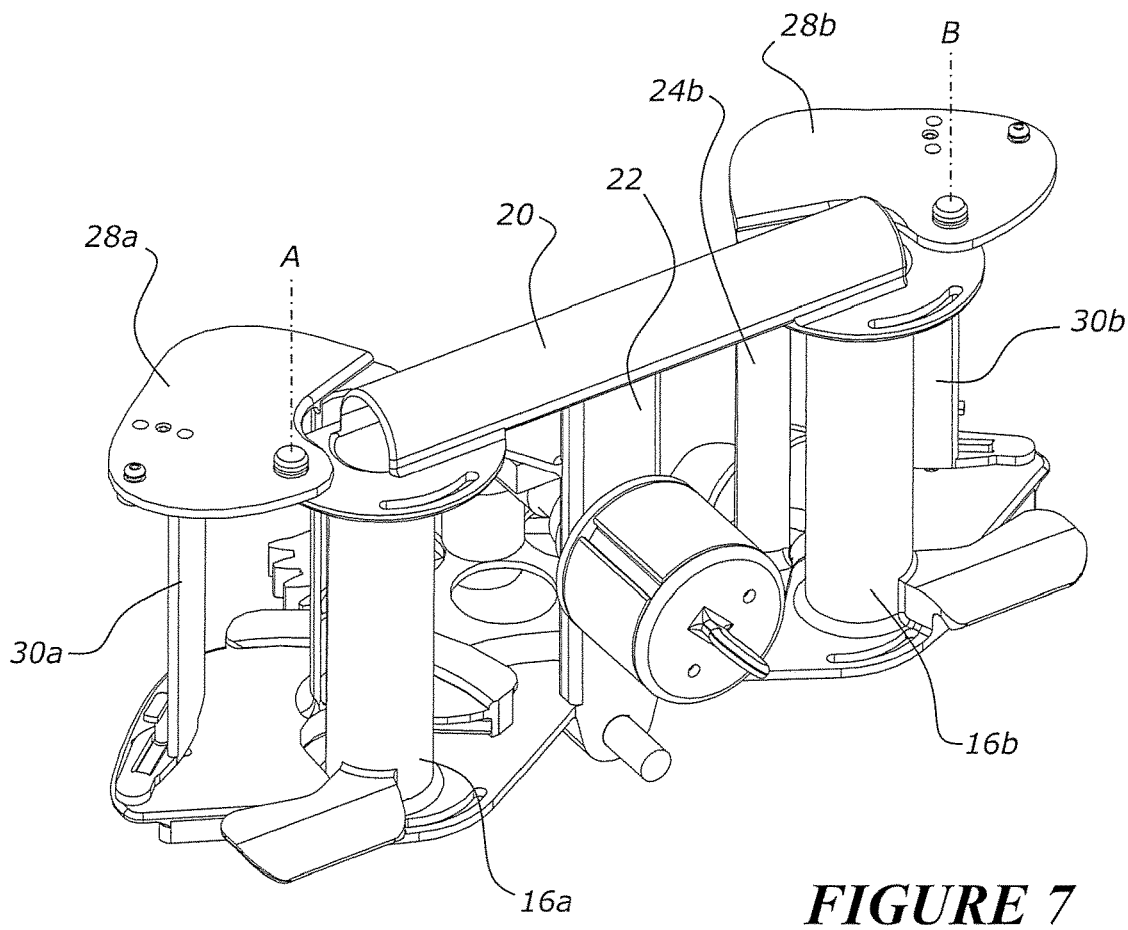
FIGS. 7 and 8 show upper front and rear views respectively of the hand grip assembly of FIGS. 3 and 4.
Figure 8:
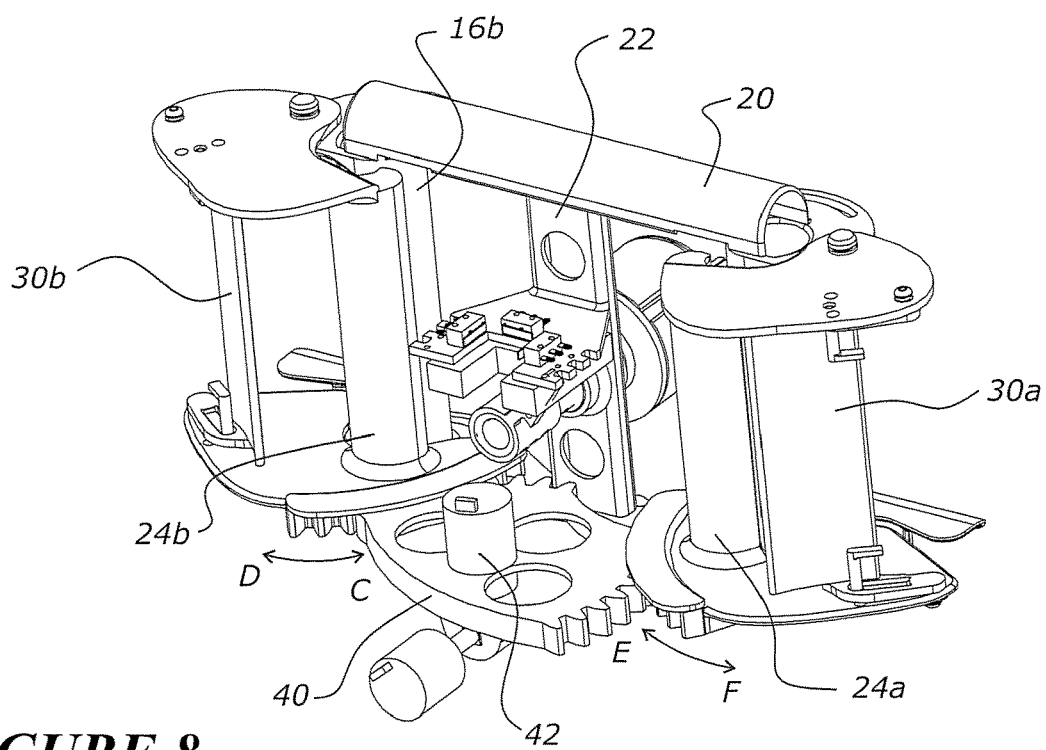
Figure 9:
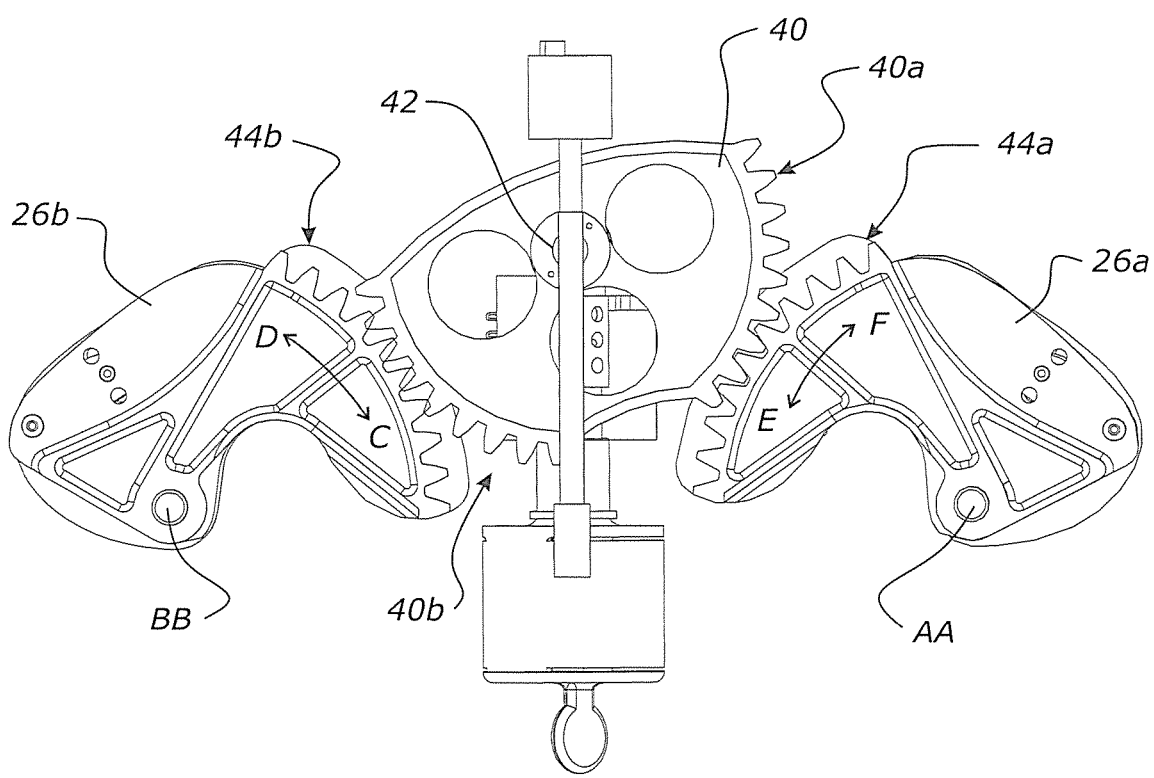
FIG. 9 shows an underside view of the hand grip assembly of FIGS. 3 and 4 but with the handlebar sub-assembly omitted from view.

In this embodiment, the release members 30a, 30b may have a position or orientation that is adjustable via upper and lower adjustment mechanisms 32a, 32b respectively (see FIG. 3).

Asymmetric Connection Mechanism

As previously discussed, the hand grip assembly is configured such that each finger grip member 24a, 24b is able to pivot toward or away from its respective handlebar member 16a, 16b to enable the user to exercise or train their finger grasp and release movement. In particular, each finger grip member may be moved between an open or release position in which the finger grip member is displaced away from its respective handlebar member, and a closed or grasp position in which the finger grip member is moved closer or adjacent to its respective handlebar member. In the open or release position, the user's fingertips are further away from their palm (e.g. like a normal relaxed hand), whereas in the closed or grasp position the user's fingertips are closer to the palm of the hand (i.e. more fist like).

In this embodiment, the hand grip assembly is configured such that that moveable finger grip members 24a, 24b are operatively coupled for asymmetric movement such that if one finger grip member is undergoing a grasp movement toward the closed or grasp position, the other finger grip member simultaneously undertakes the opposite release movement in which the finger grip member moves toward the open or release position, and vice versa. The asymmetric connection mechanism between the finger grip members generates a reciprocating seesaw-like synchronised movement relationship in which when one finger grip member is in the open or release position, the other finger grip member is in the closed or grasp position, and vice versa. The purpose of this is that the user's unaffected hand can be used to power the user's other affected or partially paralysed hand, i.e. a grasp movement of the unaffected hand will cause a release movement of the affected hand, and a release movement of the unaffected hand will cause a grasping movement of the affected hand. The user can repetitively move their unaffected hand between the grasp and release positions to cause a corresponding opposing or opposite movement sequence in the other affected hand, thereby training the grasp and release movement in the affected hand and assisting in neuroplasticity retraining for example.

In this embodiment, the finger grip sub-assemblies are operatively coupled by an asymmetric connection mechanism. In this embodiment, the asymmetric connection mechanism is provided in the form of gearing or gears. Referring to FIGS. 2 and 5-9, the asymmetric connection mechanism comprises a central connecting gear 40 situated between the pair of finger grip sub-assemblies or handlebar members. The connecting gear 40 is substantially planar and pivotally mounted to the base 18 of the handlebar assembly via pivotal connection 42. Geared or toothed surfaces 40a and 40b are provided on opposing peripheral surfaces of the connecting gear 40 and these are configured to mesh with corresponding or complementary toothed or geared formation of surfaces 44a, 44b provided or which project from the lower plates 26a, 26b of the finger grip sub-assembly. This geared asymmetrical arrangement means that for example, when a finger grip member 24a is pivoted in direction E into the closed or grasp position, the central connecting gear 40 pivots and drives the other finger grip member 24b in direction D into the open or release position, and vice versa (see FIGS. 8 and 9).

It will be appreciated that any other suitable asymmetric connection mechanism to create this seesaw-like reciprocating motion between the finger grip members may be used.

Mounting Assembly

As previously discussed, in this embodiment the rehabilitation device 10 comprises the hand grip assembly 12 that is pivotally mounted to a mounting assembly 14, which provides additional degrees of freedom of movement of the rehabilitation device 10 to assist in exercising of the user's wrists and/or arms and shoulders in combination with finger grasp and release exercise movements provided by the hand grip assembly 12. Referring to FIGS. 1 and 10-12, in this embodiment the mounting assembly enables the hand grip assembly 12 to rotate relative to at least one pivot axis. In the embodiment shown, the mounting assembly provides two orthogonal or transverse pivot axes about which the hand grip assembly may rotate, tilt or pivot.

In this embodiment, the mounting assembly comprises a base 50 that is configured to be releasably securable or mountable to a support surface or structure such as a table or similar via securing a mounting assembly such as screw clamps 54 or similar as shown. In alternative embodiments, it will be appreciated that the mounting assembly could be configured for permanent or semi-permanent mounting to a wall structure or other support structure if desired.

Figure 10:
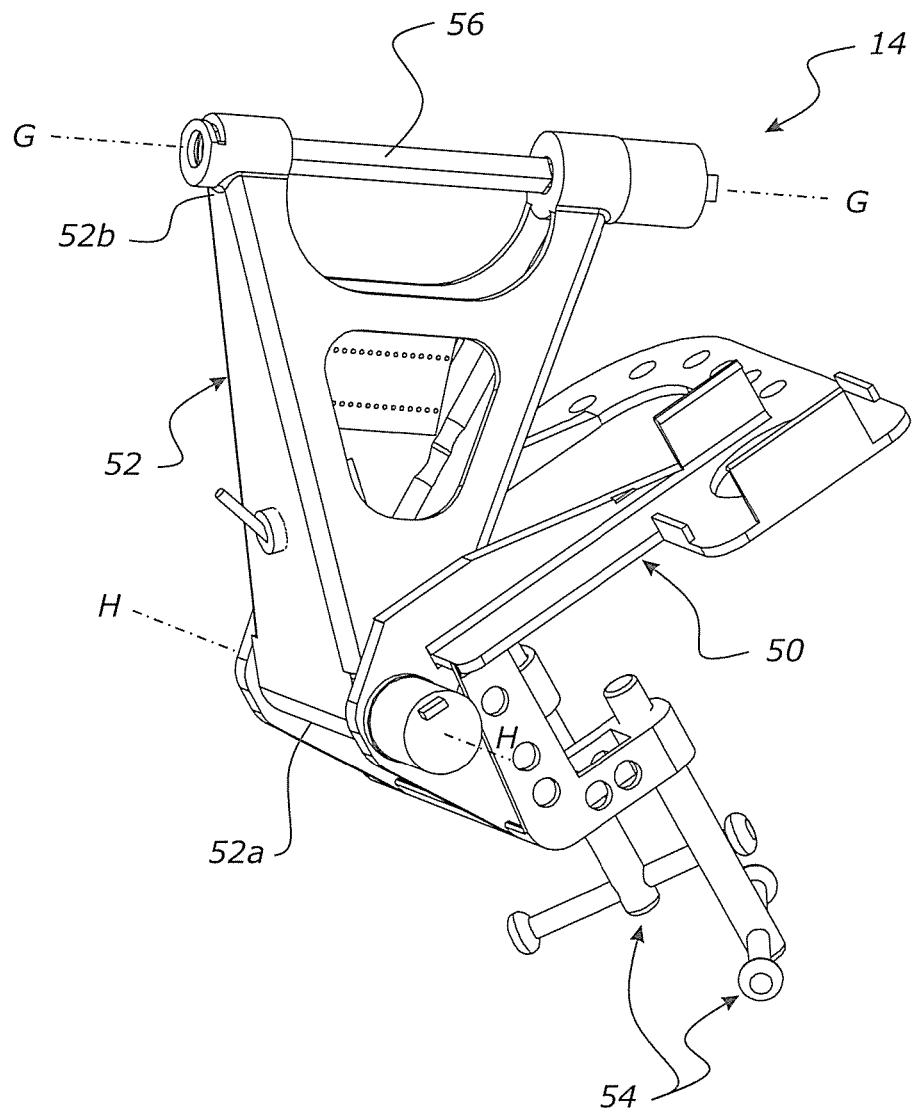
FIG. 10 shows an upper front perspective view of a mounting assembly of the bilateral hand rehabilitation device in accordance with an embodiment.
Figure 11:
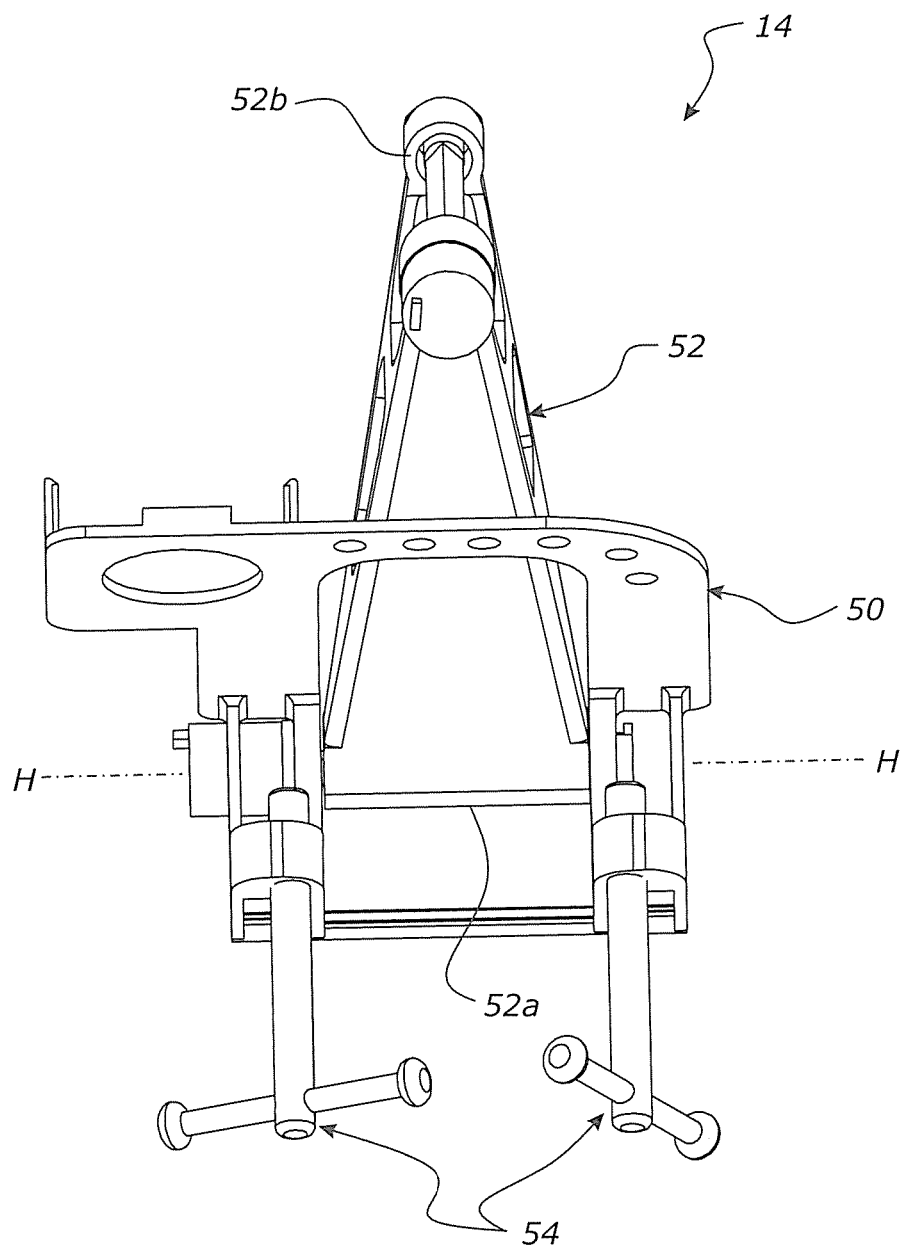
FIG. 11 shows a rear elevation view of the mounting assembly of FIG. 10.
Figure 12:
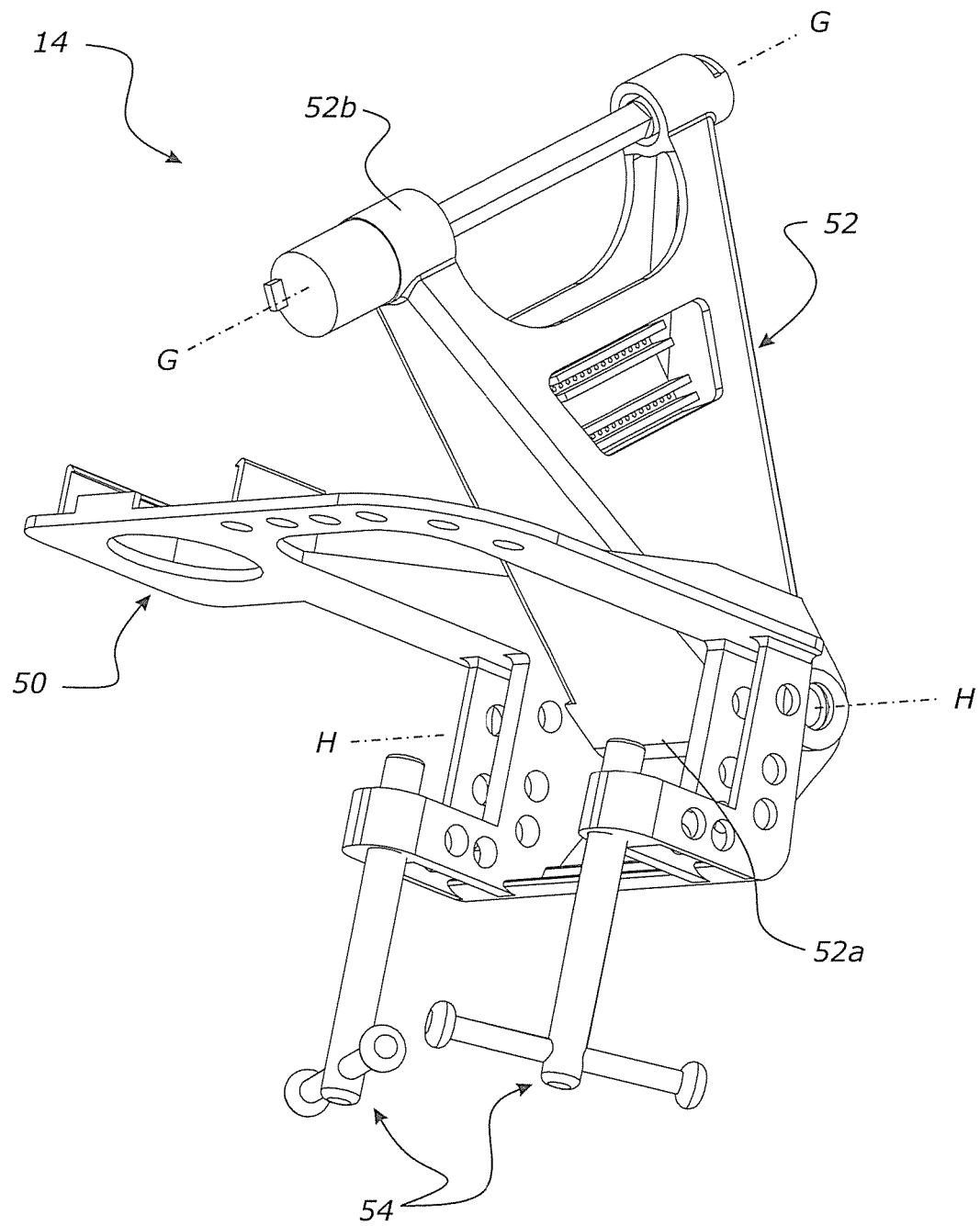
FIG. 12 shows a lower rear perspective view of the mounting assembly of FIG. 10.

In this embodiment, the mounting assembly 14 further comprises a link member generally indicated at 52, which extends between a first 52a and a second end 52b. The first end 52a of the link member 52 is pivotally coupled to the base 50 such that the link member can rotate about a pivot axis HH relative to the base 50. The hand grip assembly 12 is pivotally mounted to the second end 52b of the link member 52 such that the hand grip assembly 12 can rotate relative to the link member about a pivot axis GG. The pivotal connection or coupling between the base 50 and lower first end 52a of the link member 52, and the pivotal connection or coupling between the hand grip assembly 12 and upper second end 52b of the link member 52 may be provided by pivot or rotation shafts that extend through complementary cylindrical bores or similar provided in the components as shown. For example, FIG. 10 shows the rotation shaft 56 associated with the upper pivot axis GG of the mounting assembly by way of example.

In this embodiment, the two rotational or pivot axes GG and HH are orthogonal or transverse relative to each other, and spaced apart. This provides the hand grip assembly 12 with two degrees of freedom of rotation. In this embodiment, the first pivot axis GG extends in the bisecting plane between the handlebar members 16a, 16b of the hand grip assembly to enable the handle grip assembly to be tilted from side to side, i.e. tilted side to side either left or right. This first pivot axis GG generally corresponds or extends in a plane that corresponds to the sagittal plane of the user of the device. The second pivot axis HH is orthogonal to the first pivot axis GG, and is configured to allow the hand grip assembly to pivot back and forth, i.e. toward and away from the user. By way of example, the second pivot axis HH typically extends in a plane that is parallel to the coronal plane of the user of the device.

In other alternative embodiments, the mounting assembly may only have one degree of freedom of movement or only one pivot axis, or multiple pivot axes to provide multiple degrees of freedom of movement. It will also be appreciated that in an another alternative embodiment, the mounting assembly may not have any pivot axes and may be a fixed structure for mounting the hand grip assembly.

User Operation

Figure 13:
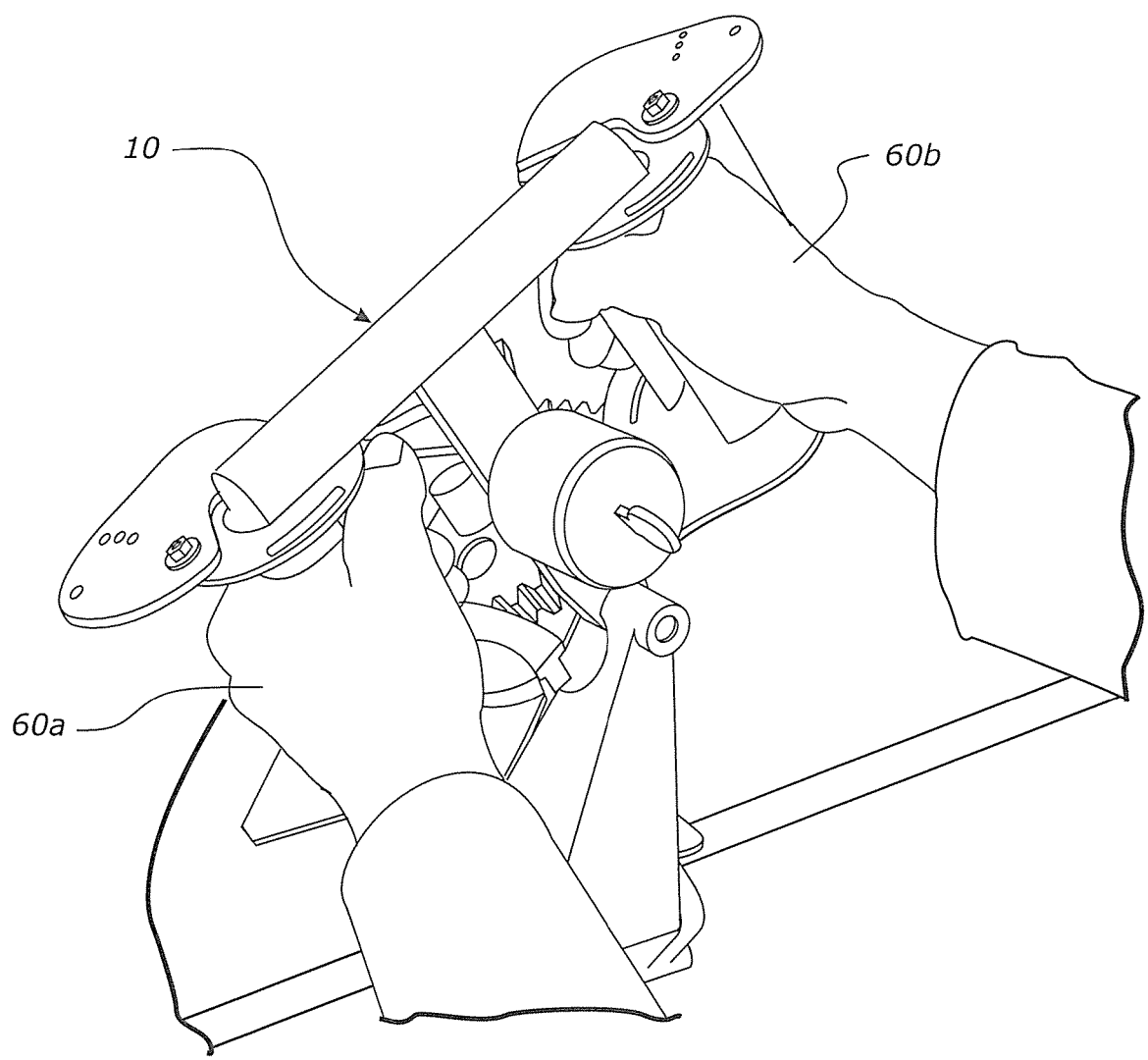
FIGS. 13-15 show various views of the bilateral hand rehabilitation device being used and gripped by the hands of a user.
Figure 14:
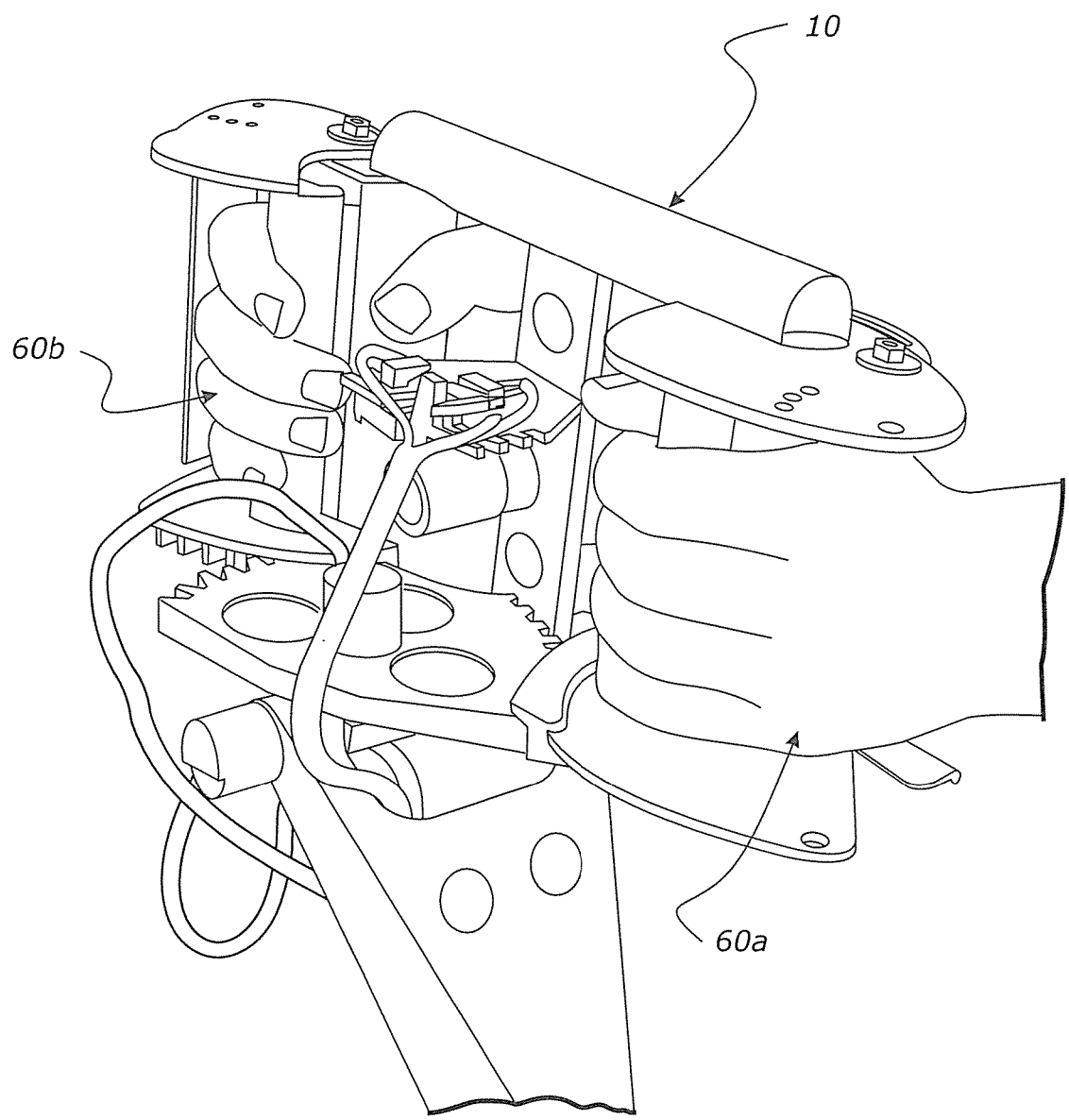
Figure 15:
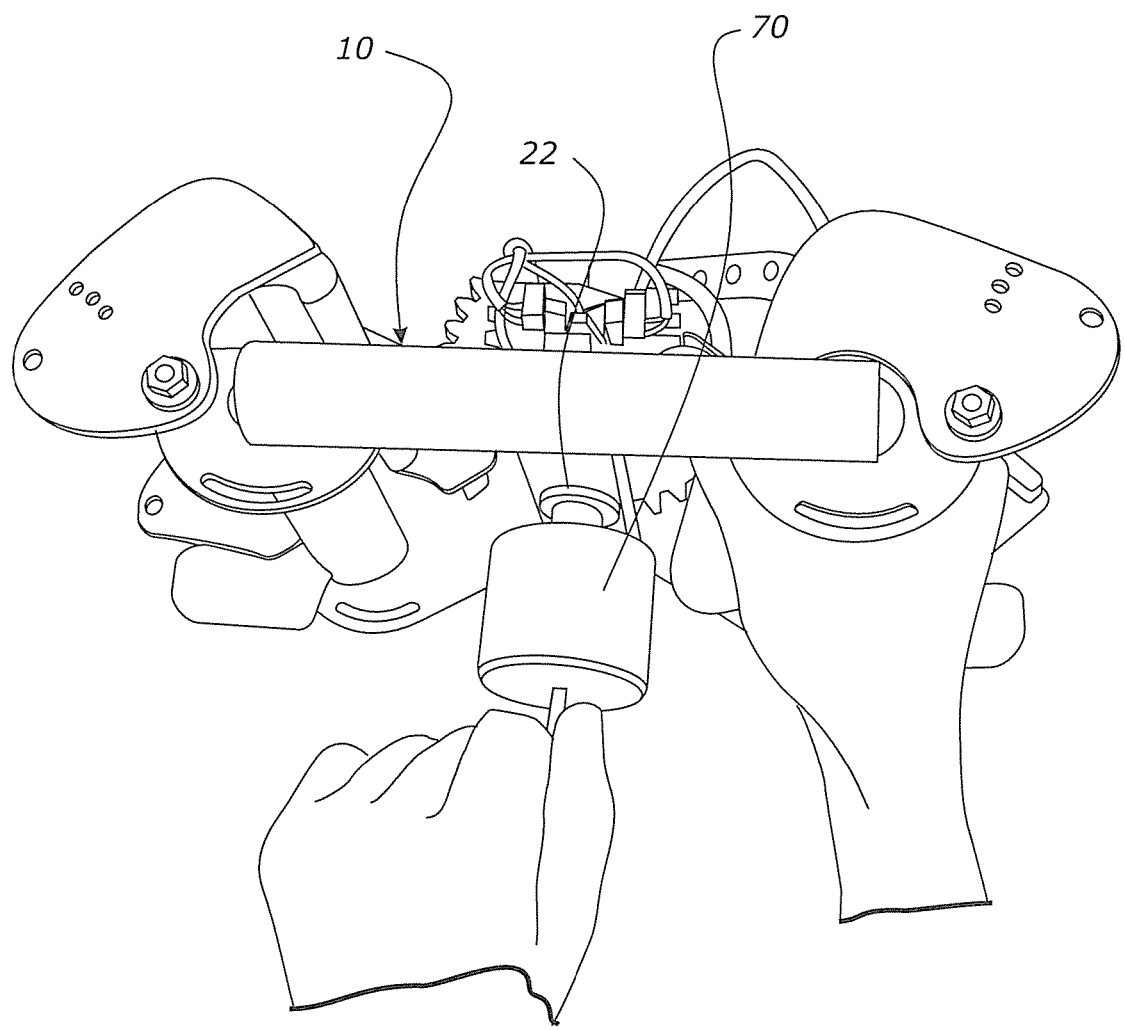

FIGS. 13-15 show views of hands 60a, 60b using the rehabilitation device 10 by way of example. As shown, the user's hands 60a, 60b grip a respective handlebar with their palms and thumb, and their fingers grip the finger grip member associated with the handlebar member. FIG. 15 also shows the user operating or interacting with a knob or switch 70 mounted to the central upright frame member 22, which may generate signals to enable interaction with a gaming system for example.

Sensors and Switches

In this embodiment, the bilateral hand rehabilitation device 10 further comprises one or more movement or rotation or position sensors, load sensors, and/or switches that are configured to sense interaction with the bilateral hand rehabilitation device by a user. The output signals of such sensors and switches may be used to interact with a gaming system as described next.

Figure 2:
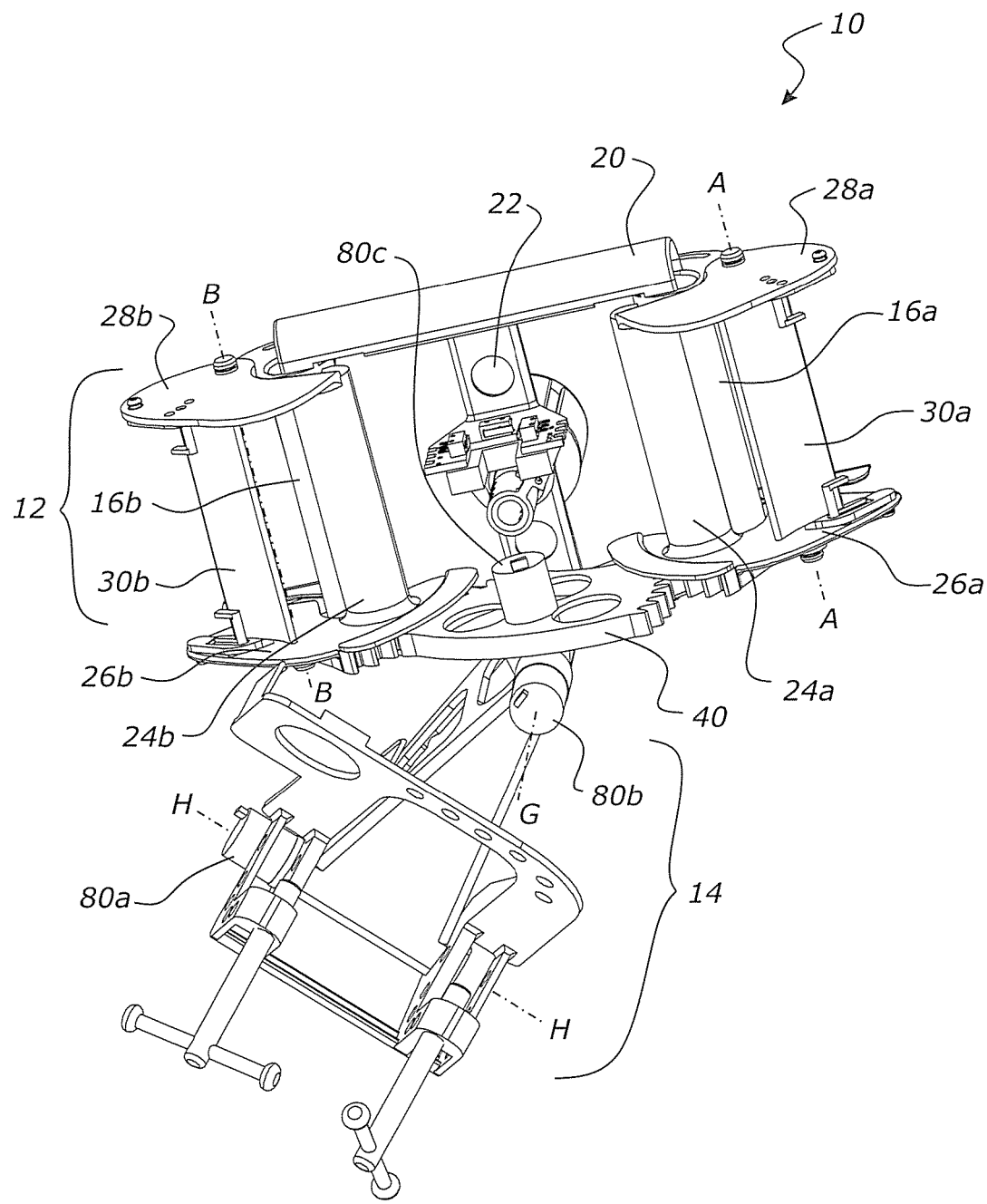
FIG. 2 shows a rear perspective view of the bilateral hand rehabilitation device of FIG. 1.

By way of example, in this embodiment, position or rotation sensors are provided on various pivot axes of the rehabilitation device 10. Referring to FIG. 2, a position or rotation sensor 80a-80c, for example a rotary encoder, is provided on each of the pivot axes associated with the mounting assembly for sensing tilt or pivoting of the device in the side-to-side and fore-aft directions or planes, and on the pivotal connection associated with the central gear connector 40 to provide an indication as to the position of the finger grip members relative to their respective handlebar members, i.e. where they are along the movement or pivot pathway between the grasp and release positions. It will be appreciated that other types or forms of movement sensors may alternatively or additionally be used at the same or different locations on the device including, but not limited to, rotation sensors in the form of potentiometers, inertial sensors such as gyroscopes and accelerometers, magnetometers, or the like.

The rehabilitation device may also comprise one or more actuatable switches or dials or buttons or knobs that may be operated to generate switch signals. Such switches may be configured for direct actuation by the fingers or hands of the user, such as the knob 80 shown in FIGS. 1 and 15, or could be integrated switches, such as micro-switches, that are configured for indirect actuation by components of the rehabilitation device during particular movements or operation of the device by a user.

Figure 16:
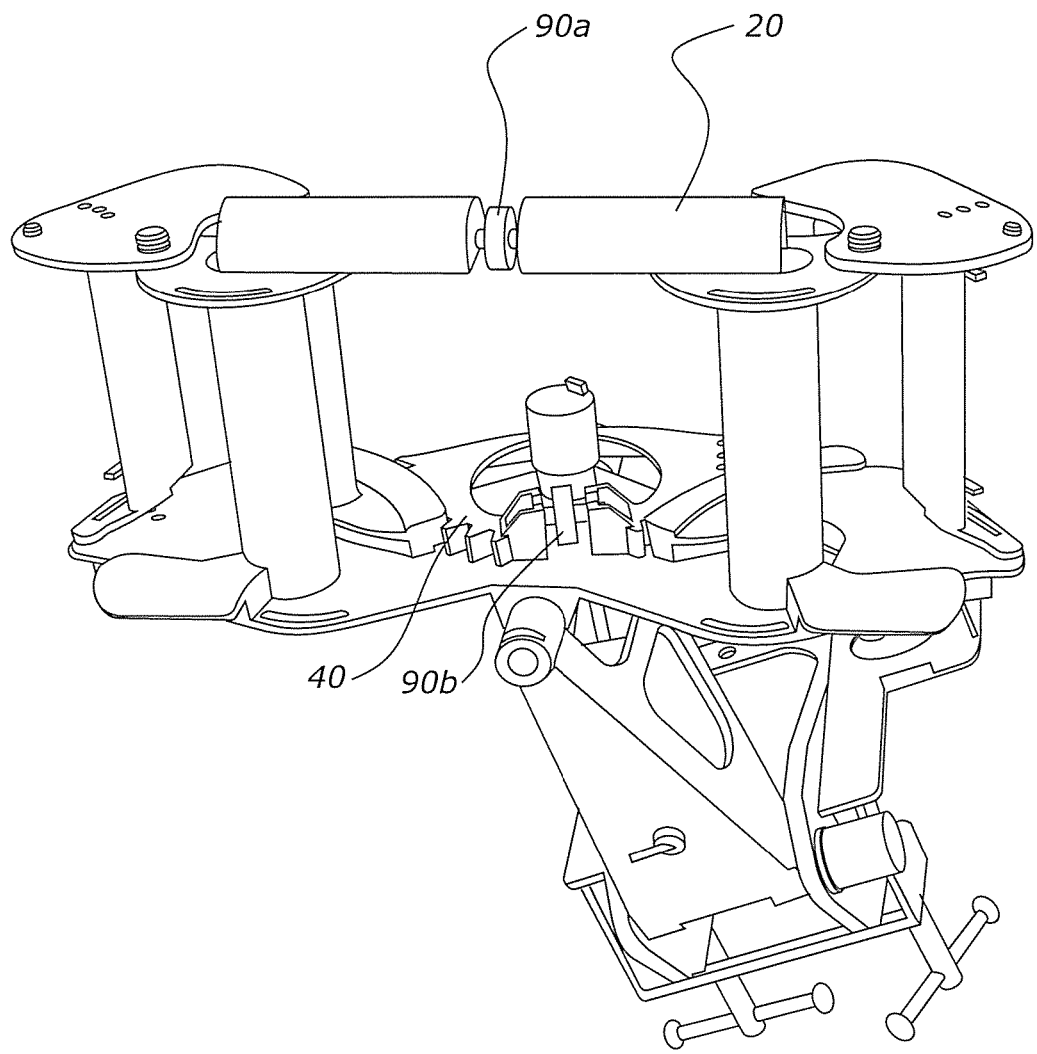
FIG. 16 shows another embodiment of the bilateral hand rehabilitation device having a load sensor or sensors.

The rehabilitation device may also comprise one or more load or force sensors for sensing force or load occurring in the rehabilitation device during use. By way of example only, FIG. 16 shows an embodiment of the rehabilitation device in which load sensors 90a, 90b are provided in the central connecting gear or linkage 40 and the crossbar member 20. In this configuration, the load sensors or cells generate force signals that can be processed over time and exercise sessions to determine if the unaffected hand is assisting the stroke-affected hand, or otherwise compare the strength of each hand to determine if the affected-paralyzed hand is assisting or resisting motion (e.g. finger grasp or release motion) and whether recovery is taking place as shown by reduction in the assistance from the unaffected hand, for example.

Interactive Gaming System

In an embodiment, the bilateral hand rehabilitation device 10 can be operatively connected to an interactive gaming system and the output signals from the one or more sensors and/or switches are processed to enable the user to interact with the gaming system via moving and manipulating the bilateral hand rehabilitation device, including operating switches either directly or via particular movements of the rehabilitation device.

Figure 17:
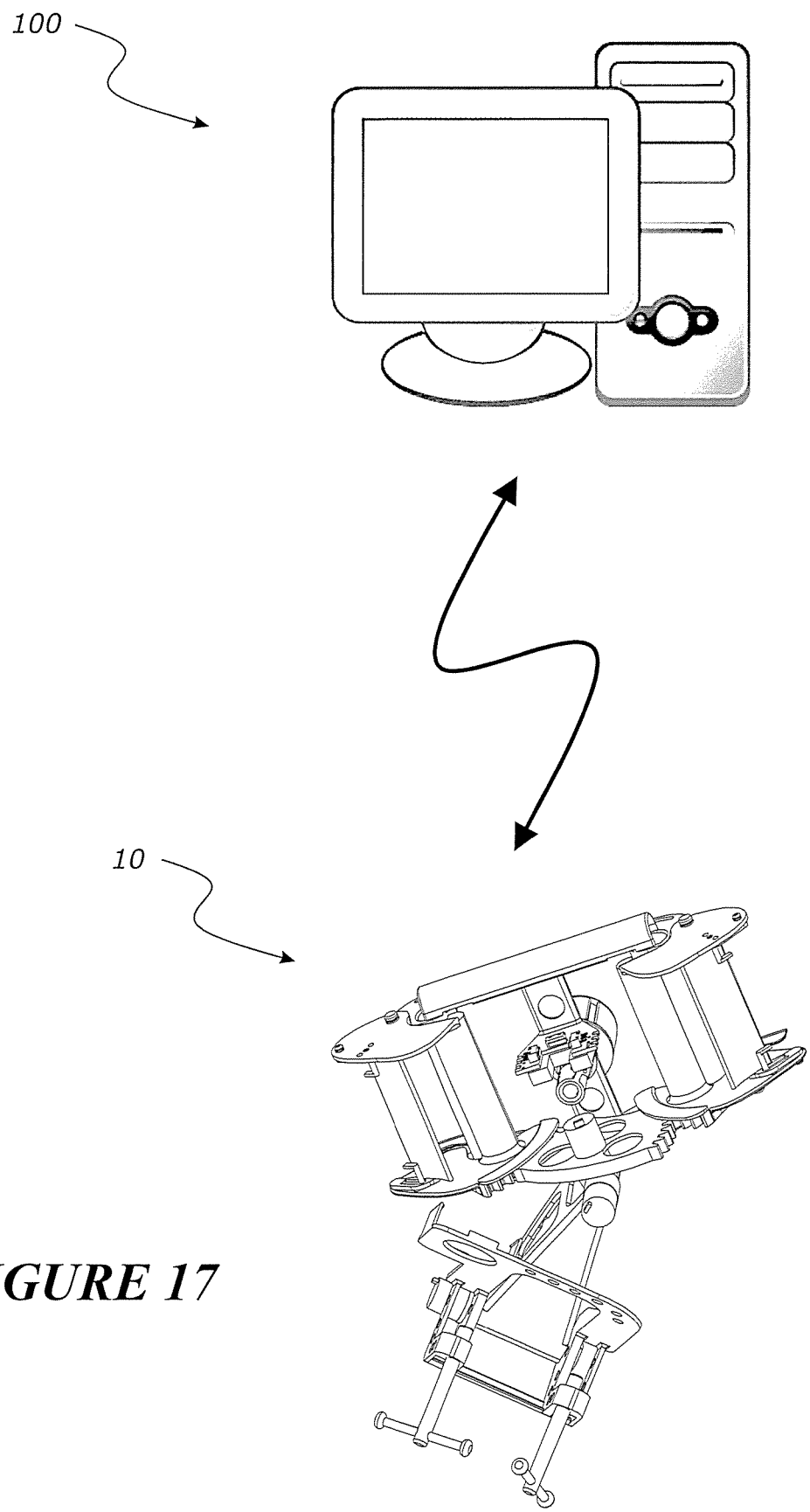
FIG. 17 shows a schematic view of a bilateral hand rehabilitation system comprising the bilateral hand rehabilitation device of FIG. 1 operatively coupled to an interactive gaming system.

As shown in FIG. 17, the rehabilitation device 10 may be operatively connected to an interactive gaming system (e.g. a computer, smart television, gaming console, or any other programmable device or system with an associated display) over a wired or wireless data link or communication link. The sensor or switch signals may be pre-processed and sent to an API of the gaming system, or raw sensor signals may be sent to the gaming system and processed into signals to enable interaction with the game presented on the display. By way of example, the games presented may require the user to carry out specific movements or sequences of the finger grasp and release movements, and/or tilting of the device side-to-side and fore-aft to maneuver or control on-screen icons or graphics or characters or otherwise interact with a game. In this configuration, the rehabilitation device acts as a control device or input device to the gaming system to enable user interaction, in much the same way as a joy stick, game controller, or other input devices such as keyboard and mouse. In one example, the motion and interaction with the rehabilitation device 10 can control an on-screen cursor or pointer for example, with switch actuation being used to function as generate 'mouse' clicks.

The use of the rehabilitation device 10 with a gaming system 100 encourages long-term use of the device and further challenges the user to assist their recovery.

The foregoing description of the invention includes preferred forms thereof. Modifications may be made thereto without departing from the scope of the invention as defined by the accompanying claims.

The invention claimed is:

1. A bilateral hand rehabilitation device comprising:
a pair of left and right handlebar members that are fixedly coupled or connected together and each having a longitudinal axis;
a pair of moveable left and right finger grip members, one for each of the handlebar members, each finger grip member being elongate and having a longitudinal axis that is maintained in substantially parallel alignment to the longitudinal axis of its respective handlebar member during movement, and each finger grip member being moveably mounted with respect to its respective handlebar member for movement toward and away from the handlebar member to facilitate a user finger grasp and release movement when in use; and
an asymmetric connection mechanism that operatively couples the pair of finger grip members to each other for simultaneous asymmetric movement of the finger grip members such that a movement of one finger grip member toward or away from its respective handlebar member causes the other finger grip member to move in the opposite direction away or toward its respective handlebar member.

2. A bilateral hand rehabilitation device according to claim 1, wherein the bilateral hand rehabilitation device further comprises a handlebar assembly, wherein the handlebar assembly comprises a base, the pair of handlebar members and an upper crossbar member.

3. A bilateral hand rehabilitation device according to claim 2, wherein the pair of handlebar members are provided on or mounted to the base, and wherein the base is substantially planar and the handlebar members extend vertically upward from the base, each terminating at an upper end, and wherein the upper crossbar member extends horizontally between the upper ends of the pair of handlebar members.

4. A bilateral hand rehabilitation device according to claim 2, wherein each finger grip member has an upper end and a lower end, and wherein the pair of finger grip members further comprise upper and lower transverse connecting plates that are coupled to the upper and lower ends of each respective finger grip member to provide respective finger grip assemblies, and wherein the finger grip assemblies are pivotally mounted adjacent or relative to their respective handlebar members on opposite sides of the handlebar assembly via pivotal connections or couplings between the upper and lower connecting plates of each finger grip assembly and respective upper and lower portions of the handlebar assembly.

5. A bilateral hand rehabilitation device according to claim 4, wherein each finger grip assembly further comprises a release member that extends between the upper and lower connecting plates and which is offset from the finger grip member, and wherein each release member is configured to engage or face outer or dorsal finger surfaces of a hands of a user when in use.

6. A bilateral hand rehabilitation device according to claim 4, wherein each finger grip assembly further comprises a release member that extends between the upper and lower connecting plates and which is offset from the finger grip member, and wherein a position and orientation of each release member relative to its respective finger grip member is adjustable.

7. A bilateral hand rehabilitation device according to claim 4, wherein each finger grip assembly further comprises a release member that extends between the upper and lower connecting plates and which is offset from the finger grip member, and wherein each release member has a longitudinal axis that is parallel to the longitudinal axes of its respective finger grip members and handlebar members.

8. A bilateral hand rehabilitation device according to claim 1, wherein the handlebar members, finger grip members, and asymmetric connection mechanism are parts of a hand grip assembly, and the device further comprises a mounting assembly to which the hand grip assembly is pivotally mounted, and wherein the mounting assembly provides the hand grip assembly with at least one degree of pivotal movement.

9. A bilateral hand rehabilitation device according to claim 8, wherein the mounting assembly provides the hand grip assembly with at least two degrees of pivotal movement.

10. A bilateral hand rehabilitation device according to claim 8, wherein the hand grip assembly is pivotal relative to two orthogonal pivot axes provided by the mounting assembly, and wherein the two pivot axes provided by the mounting assembly are spaced-apart.

11. A bilateral hand rehabilitation device according to claim 8, wherein the mounting assembly provides a first pivot axis extending in a bisecting plane between the handlebar members of the hand grip assembly, to enable the hand grip assembly to be tilted from side to side, and a second pivot axis that is a transverse orientation relative to the first pivot axis and which allows the hand grip assembly to pivot back and forth, and wherein the first pivot axis extends in a plane that corresponds to a sagittal plane of the user of the device, and the second pivot axis extends in a plane parallel to a coronal plane of the user of the device.

12. A bilateral hand rehabilitation device according to claim 1, wherein the finger grip members are pivotally mounted for pivotal or arced movement in a path or range toward and away from their respective handlebar members, and wherein the path or range of pivotal movement of each finger grip member is restricted between a closed or grasp position at or toward its respective handlebar member, and an open or release position displaced away from its respective handlebar member.

13. A bilateral hand rehabilitation device according to claim 12, wherein each finger grip member has a pivot axis which is offset relative to the longitudinal axis of its respective handlebar member, and wherein the pivot axis of each finger grip member is configured to be offset into substantial alignment with knuckles of a hand of a user of the device.

14. A bilateral hand rehabilitation device according to claim 1, wherein each handlebar member is configured to engage a palm and/or a thumb of a hands of a user, and wherein each finger grip member is configured to engage or be gripped by inner finger surfaces of a hand of a user.

15. A bilateral hand rehabilitation device according to claim 1, wherein the pair of handlebar members have longitudinal axes that are parallel to each other.

16. A bilateral hand rehabilitation device according to claim 1, wherein the pair of handlebar members are vertical or upright members.

17. A bilateral hand rehabilitation device according to claim 1, wherein the pair of handlebar members have longitudinal axes that extend at an angle either toward or away from one another.

18. A bilateral hand rehabilitation device according to claim 1, wherein the pair of handlebar members have longitudinal axes that are co-axial such that they are aligned in a common axis.

19. A bilateral hand rehabilitation device according to claim 1, further comprising one or more sensors and/or switches that are configured to sense interaction with the bilateral hand rehabilitation device by a user, and wherein the bilateral hand rehabilitation device is operatively connected to an interactive gaming system and output signals from the one or more sensors and/or switches are processed to enable the user to interact with the gaming system via moving and manipulating the bilateral hand rehabilitation device and/or operating the one or more switches.

20. A bilateral rehabilitation system comprising:
a bilateral hand rehabilitation device according to claim 1; and
an interactive gaming system that presents an interactive game to a user of the rehabilitation device on a display and processes sensor and/or switch output signals generated in response to user interaction with the rehabilitation device to enable the user to interact with the present game via use of the rehabilitation device as an input or control device for the interactive gaming system.

21. A bilateral hand rehabilitation device comprising:
a pair of left and right handlebar members that are fixedly coupled or connected together;
a pair of moveable left and right finger grip members, one for each of the handlebar members, each finger grip member being elongate and having a longitudinal axis that is substantially parallel to the longitudinal axis of its respective handlebar member, and each finger grip member being moveably mounted with respect to its respective handlebar member for movement toward and away from the handlebar member to facilitate a user finger grasp and release movement when in use; and
an asymmetric connection mechanism that operatively couples the pair of finger grip members to each other for simultaneous asymmetric movement of the finger grip members such that a movement of one finger grip member toward or away from its respective handlebar member causes the other finger grip member to move in the opposite direction away or toward its respective handlebar member;
wherein the bilateral hand rehabilitation device further comprises a handlebar assembly, wherein the handlebar assembly comprises a base, the pair of handlebar members and an upper crossbar member;
wherein the pair of handlebar members are provided on or mounted to the base, and wherein the base is substantially planar and the handlebar members extend vertically upward from the base, each terminating at an upper end, and wherein the upper crossbar member extends horizontally between the upper ends of the pair of handlebar members.

22. A bilateral hand rehabilitation device comprising:
a pair of left and right handlebar members that are fixedly coupled or connected together;
a pair of moveable left and right finger grip members, one for each of the handlebar members, each finger grip member being elongate and having a longitudinal axis that is substantially parallel to the longitudinal axis of its respective handlebar member, and each finger grip member being moveably mounted with respect to its respective handlebar member for movement toward and away from the handlebar member to facilitate a user finger grasp and release movement when in use; and
an asymmetric connection mechanism that operatively couples the pair of finger grip members to each other for simultaneous asymmetric movement of the finger grip members such that a movement of one finger grip member toward or away from its respective handlebar member causes the other finger grip member to move in the opposite direction away or toward its respective handlebar member;
wherein the bilateral hand rehabilitation device further comprises a handlebar assembly, wherein the handlebar assembly comprises a base, the pair of handlebar members and an upper crossbar member;
wherein each finger grip member has an upper end and a lower end, and wherein the pair of finger grip members further comprise upper and lower transverse connecting plates that are coupled to the upper and lower ends of each respective finger grip member to provide respective finger grip assemblies, and wherein the finger grip assemblies are pivotally mounted adjacent or relative to their respective handlebar members on opposite sides of the handlebar assembly via pivotal connections or couplings between the upper and lower connecting plates of each finger grip assembly and respective upper and lower portions of the handlebar assembly.

23. A bilateral hand rehabilitation device according to claim 22, wherein each finger grip assembly further comprises a release member that extends between the upper and lower connecting plates and which is offset from the finger grip member, and wherein each release member is configured to engage or face outer or dorsal finger surfaces of a hand of a user when in use.

24. A bilateral hand rehabilitation device according to claim 22, wherein each finger grip assembly further comprises a release member that extends between the upper and lower connecting plates and which is offset from the finger grip member, and wherein a position and orientation of each release member relative to its respective finger grip member is adjustable.

25. A bilateral hand rehabilitation device according to claim 22, wherein each finger grip assembly further comprises a release member that extends between the upper and lower connecting plates and which is offset from the finger grip member, and wherein each release member has a longitudinal axis that is parallel to the longitudinal axes of its respective finger grip members and handlebar members.

* * * * *